W. M. STEHLEY.
Elastic Armor for Ships.

No. 207,218. Patented Aug. 20, 1878.

WITNESSES:
Achilles Schehl.
C. Sedgwick

INVENTOR:
W. M. Stehley
BY Munn & Co
ATTORNEYS.

UNITED STATES PATENT OFFICE.

WILLIAM M. STEHLEY, OF KING WILLIAM COURT-HOUSE, VA., ASSIGNOR TO HIMSELF AND JOHN S. McCALMONT, OF FRANKLIN, PA.

IMPROVEMENT IN ELASTIC ARMOR FOR SHIPS.

Specification forming part of Letters Patent No. 207,218, dated August 20, 1878; application filed June 10, 1878.

*To all whom it may concern:*

Figure 1:
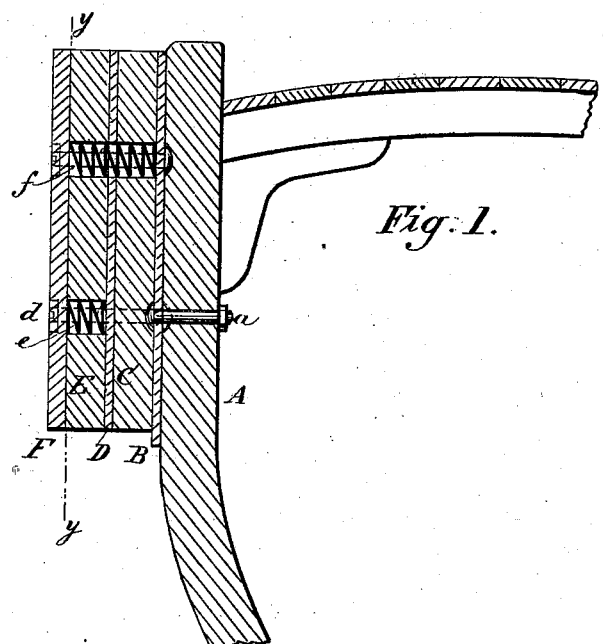
Figure 2:
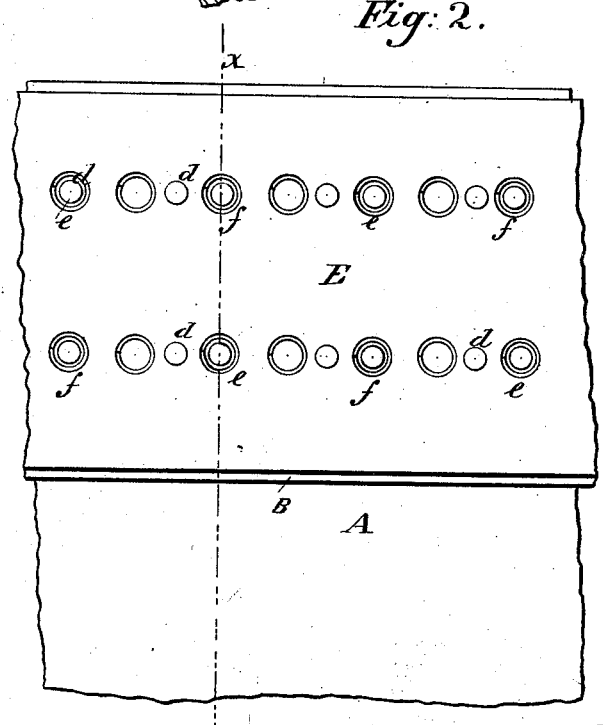

Be it known that I, WILLIAM M. STEHLEY, of King William Court-House, in the county of King William and State of Virginia, have invented a new and Improved Armor for Ships, of which the following is a specification:

Figure 1 is a vertical transverse section on line $x\,x$, Fig. 2, of a portion of a vessel having my improved armor attached. Fig. 2 is a vertical section taken on line $y\,y$ in Fig. 1.

Similar letters of reference indicate corresponding parts.

The invention will first be described in connection with the drawing, and then pointed out in the claim.

Referring to the drawing, A is the side of the ship's hull, to which are attached plates B by means of bolts $a$. To the plates B are attached the rubber cushions C and plate D by means of bolts that pass through the three members, and between the plates heavy spiral springs are placed, which act in connection with the rubber cushions in resisting the impact of the projectiles.

The rubber cushion E and outer plate, F, are secured by bolts that pass through the plate F, rubber E, and plate D, and is further secured by bolts $d$, that pass through all of the rubber cushions and all of the plates. Spiral springs $e$ are placed between the plates D F in apertures formed in the rubber, and longer spiral springs $f$ extend through the middle plate, D, and both of the rubber cushions, and abut on the plate B and support the plate F.

By means of my improved armor the blow of a projectile striking the vessel is distributed over a great surface, so the projectile does not act destructively.

I am aware that it is not new to use armor-plates and intermediate cushions; but

What I claim is—

The combination, with plates B, rigidly fastened to hull A, alternate rubber sheets, and metallic plates, of the spiral springs $f\,e$, connecting an outer plate, F, with the inner plates, B D, as shown and described.

WILLIAM M. STEHLEY.

Witnesses:
O. M. WINSTON,
GEO. T. WARING.